No. 884,200. PATENTED APR. 7, 1908.
W. C. OBERNESSER.
HYDRAULIC MOTOR.
APPLICATION FILED JUNE 8, 1907.
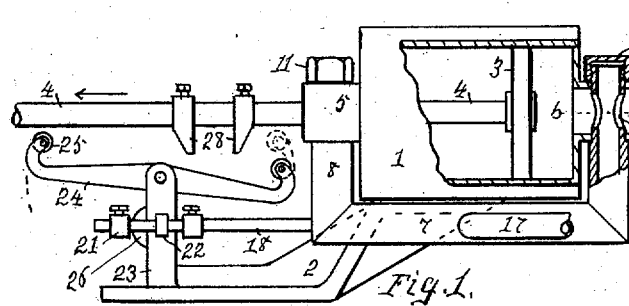
Fig. 1.
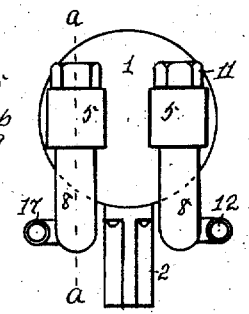
Fig. 2.
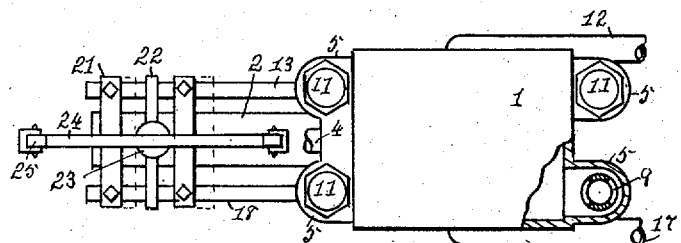
Fig. 3.
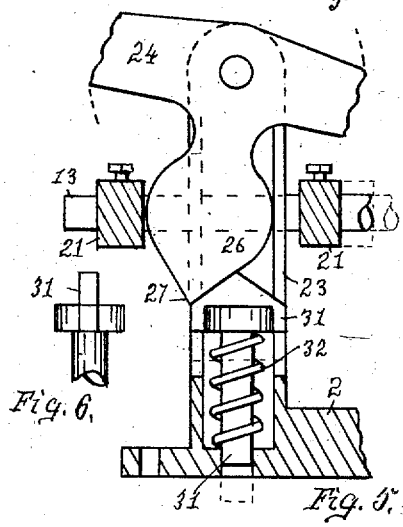
Fig. 6.
Fig. 5.
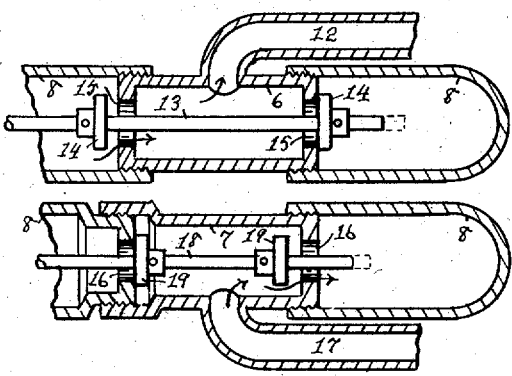
Fig. 4.
WITNESSES.
S. C. Rogers
James J. Carr
William C. Obernesser, INVENTOR.
By Robert S. Carr, Atty.

No. 884,201.   PATENTED APR. 7, 1908.
J. O'LEARY.
FENDER AND BRAKE ATTACHMENT FOR AUTOMOBILES.
APPLICATION FILED DEC. 24, 1907.

2 SHEETS—SHEET 1.

Witnesses:

Inventor
John O'Leary
By James L. Norris
Atty.

UNITED STATES PATENT OFFICE.

WILLIAM C. OBERNESSER, OF NEWPORT, KENTUCKY, ASSIGNOR TO THE PRINCESS MANUFACTURING COMPANY, OF NEWPORT, KENTUCKY, A CORPORATION OF KENTUCKY.

HYDRAULIC MOTOR.

No. 884,200.      Specification of Letters Patent.      Patented April 7, 1908.

Original application filed September 10, 1906, Serial No. 333,937. Divided and this application filed June 8, 1907. Serial No. 377,843.

*To all whom it may concern:*

Be it known that I, WILLIAM C. OBERNESSER, a citizen of the United States, residing at Newport, Kentucky, have invented a new and useful Improvement in Hydraulic Motors, of which the following is a specification.

My invention relates to hydraulic motors of the class adapted for washing machines, or for other purposes and this is a division of my application serially numbered 333,937 and filed September 10, 1906.

The objects of my improvement are to provide the balanced valves with means for actuating them instantly and for locking them in both the open and the closed positions; to provide adjustable means for controlling the length of the stroke of the piston, and to provide a simple and durable construction combined with facility of operation and efficiency of action. These objects are attained in the following described manner, as illustrated in the accompanying drawings, in which:—

Figure 1:
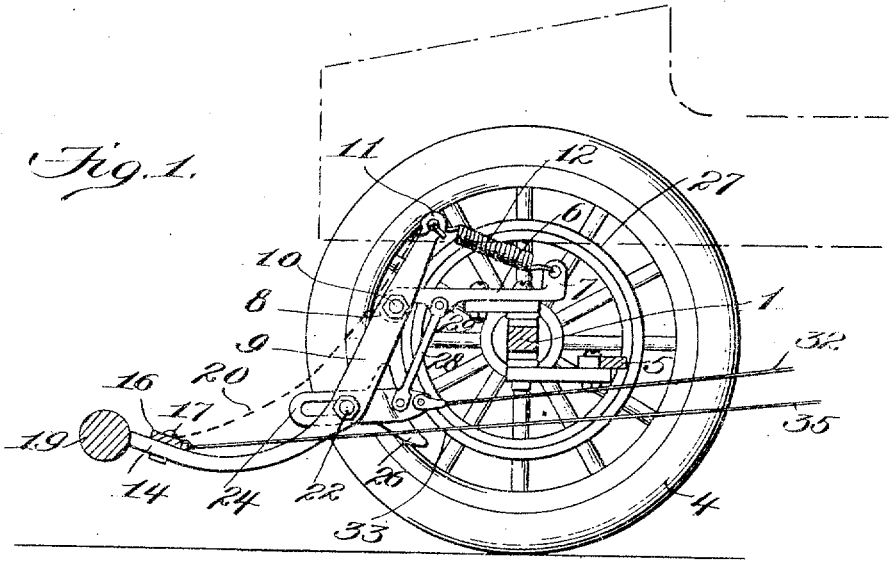
Figure 2:
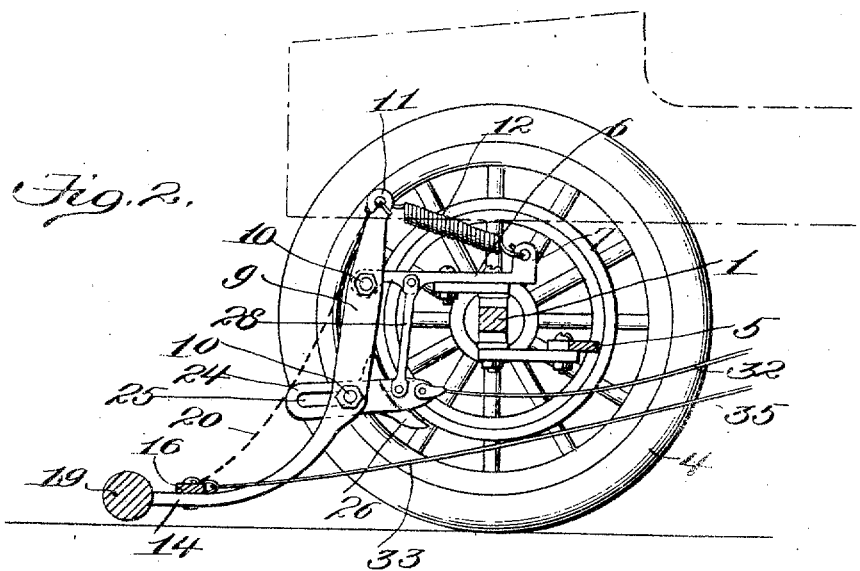

Figure 1 is a side elevation with parts in section on the line $a$—$a$ of Fig. 2 of a hydraulic motor embodying my improvements; Fig. 2, a rear elevation; Fig. 3 a plan with parts broken away and parts in section on the line $b$—$b$ of Fig. 1; Fig. 4, a horizontal section of the valve chambers with the valves in operative positions therein; Figs. 5 and 6 details of the valve actuating mechanism.

In the drawings, the cylinder 1 is mounted on a bed plate 2 and provided with piston 3, piston rod 4 and with recessed lugs 5 in its heads. Cylindrical valve chambers 6 and 7 are each connected with the corresponding lugs 5 at each end of the cylinder by means of branch pipes 8. Said pipes are provided with lateral openings 9 within, and are secured to said lugs by means of screw caps 11. Chamber 6 is provided with a discharge pipe 12 and with a valve stem 13 whereby valves 14 are movable to open or close the ports 15 therein. Chamber 7 is provided with ports 16 and with a supply pipe 17 adapted to communicate through a hose with a hydrant or other source of water under pressure. Said chamber is also provided with a valve stem 18 whereby valves 19 thereon are movable to open or close the ports 16.

The valve stems are adjustably connected together by means of transverse bars 21 and they are movable in stationary guides 22. A vertical hollow column 23 is formed on the bed plate and a rocker arm 24 is trunnioned thereon in a vertical plane with the piston rod. Said arm is provided at its ends with anti-friction rollers 25 and with a wing 26 which depends from its middle portion and is formed with its edges converged to a point 27. Tapering tappets 28 adjustably secured on the piston rod are alternately carried thereby into contact with the corresponding rollers 25 for oscillating arm 24, whereby the wing 26 alternately contacts with the corresponding bars 21 for actuating the valve rods with the valves thereon simultaneously in either of opposite directions.

A latch 31 with its edges tapered to a point is movable within column 23 and actuated by means of a spring 32 with either of its edges into engagement with the corresponding edge of wing 26 for yieldingly maintaining the rocker arm in either extreme position of its oscillation. The exertion of said spring also causes the latch to instantly complete the oscillation of the rocker arm in either direction after the point of the wing has been moved beyond the point of the latch by the action of the tappets.

In operation, when the valves are in the position shown in Fig. 4 the piston will be moved in a forward direction as indicated by the arrow in Fig. 1. The contact of the front tappet with the rocker arm moves the point of the wing beyond the point of the latch and in contact with the rear cross bar 21. Spring 32 then forces the latch to complete the rearward movement of the wing for completing the oscillation of the rocker arm and for simultaneously shifting the valve rods with the valves in reversed positions for moving the piston in the rearward direction. The valves are locked and maintained in either position under a yielding pressure by the exertion of the spring on the latch. The tappets may be adjusted along the piston rod as desired to control the length of its stroke.

Having described my invention what I claim is:—

1. In a hydraulic motor, the combination of stems provided with valves, stops adjustably connecting the stems together, a rocker arm actuated by the piston into contact with the stops, and spring actuated mechanism arranged to complete the rocking movement of the arm for moving the stops with the valves simultaneously.

2. In a hydraulic motor, the combination of stems provided with valves, stops connecting the stems together, a piston, a rocker arm actuated thereby into contact with the stops alternately, and spring actuated mechanism released thereby for moving and yieldingly maintaining the arm with the stops and valves in predetermined positions.

W. C. OBERNESSER.

Witnesses:
    DAVID J. WORKMER,
    R. S. CARR.